United States Patent
Yean et al.

[11] Patent Number: 5,258,144
[45] Date of Patent: Nov. 2, 1993

[54] METHOD OF MANUFACTURING A TRANSPARENT POLYMER MATERIAL ARTICLE WITH A REFRACTIVE INDEX GRADIENT

[75] Inventors: Leanirith Yean, Longjumeau; Georges Wajs, Ivry; Gérard Martin, Antony; Patrick Guerrero, Lorrez Le Bacage, all of France

[73] Assignee: Essilor International Cie Generale d'Optique, Creteil Cedex, France

[21] Appl. No.: 833,532

[22] Filed: Feb. 10, 1992

[30] Foreign Application Priority Data

Mar. 8, 1991 [FR] France ............... 91 02827

[51] Int. Cl.⁵ .............................. B29D 11/00
[52] U.S. Cl. ...................... 264/1.7; 264/162; 264/2.7; 264/343; 351/160 H; 351/175
[58] Field of Search ............ 264/1.7, 1.1, 162, 2.7, 264/343; 351/160 H, 175

[56] References Cited

U.S. PATENT DOCUMENTS

| | | |
|---|---|---|
| 3,486,808 | 12/1969 | Hamblen . |
| 3,718,383 | 2/1973 | Moore . |
| 3,916,033 | 10/1975 | Merrill ............... 264/1.7 |
| 4,153,349 | 5/1979 | Wichterle ........... 351/160 H |
| 4,208,362 | 6/1980 | Deichert et al. ........ 264/1.7 |
| 4,978,481 | 12/1990 | Janssen et al. ......... 264/1.7 |
| 5,075,106 | 12/1991 | Goldenberg .......... 424/429 |

FOREIGN PATENT DOCUMENTS 0109586 5/1984 European Pat. Off. .
59-152406 8/1984 Japan ................ 264/1.7

OTHER PUBLICATIONS

Patent Abstracts of Japan vol. 10, No. 22 (P-424) Jan. 28, 1986 JP-A-60 175 009 (Nihon Ita Glass et Alia) Sep. 9, 1985.

*Primary Examiner*—Jeffery Thurlow
*Assistant Examiner*—Mathieu Vargot
*Attorney, Agent, or Firm*—Young & Thompson

[57] ABSTRACT

In a method of manufacturing a transparent polymer material article having a refractive index gradient the polymer base material is caused to absorb a swelling agent including at least a monomer adapted to yield a polymer having a refractive index different than that of the polymer base material. A first preform having a first geometry is formed from the polymer base material sufficiently polymerized for the first preform to be self-supporting. A confinement space is defined between the first preform and an abutment member having facing it a second geometry at least partly different than the first geometry and having a greater volume than the latter. The first preform is brought into contact in the confinement space with a sufficient quantity of swelling agent for the swelling to which it is then subject to cause it to be urged actively into contact with all points of the second geometry. The resulting polymer material is polymerized and the second preform thus obtained is machined, if necessary, to the required final geometry of the required article. The method finds an application in the manufacture of ophthalmic lenses.

29 Claims, 3 Drawing Sheets

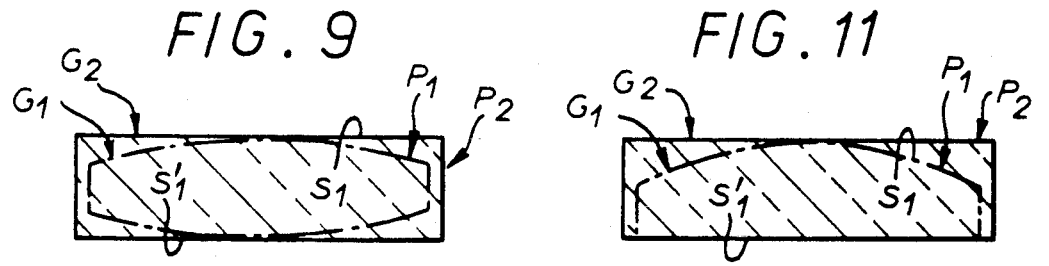
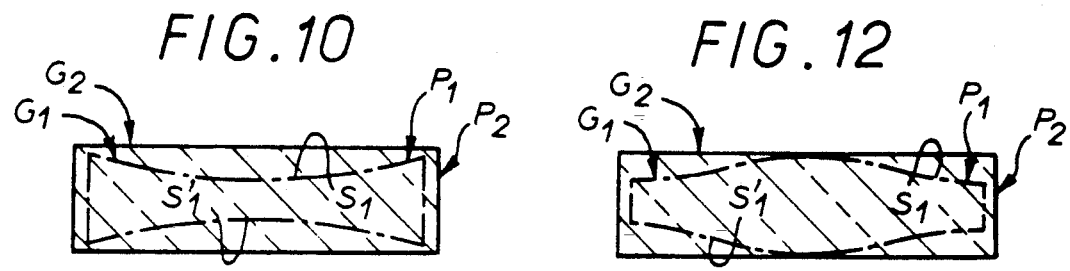
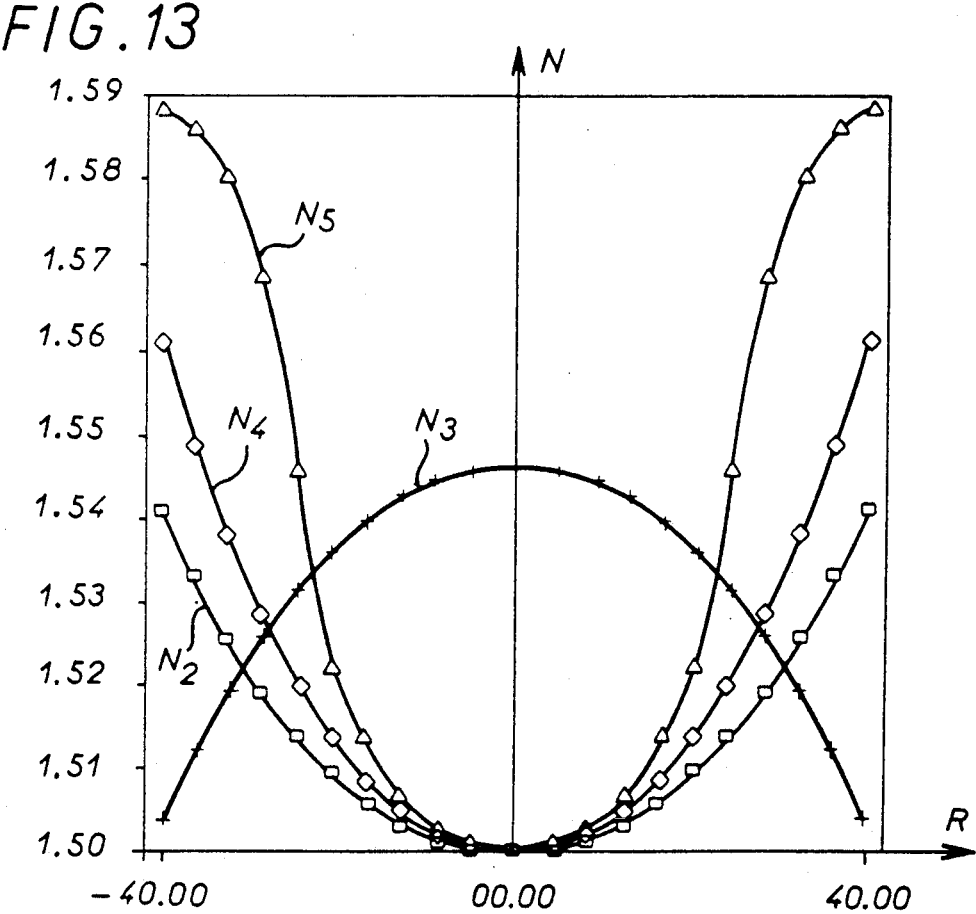
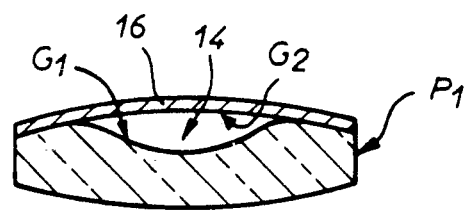

METHOD OF MANUFACTURING A TRANSPARENT POLYMER MATERIAL ARTICLE WITH A REFRACTIVE INDEX GRADIENT

BACKGROUND OF THE INVENTION

1. Field of the invention

The present invention concerns the manufacture of a transparent polymer material article with a refractive index gradient whereby the refractive index varies continuously in at least one direction.

It is more particularly, although not necessarily exclusively, directed to the situation in which the article can be used to manufacture an ophthalmic lens.

It is known that varying the refractive index of an ophthalmic lens makes it possible to reduce the maximum thickness and therefore the weight so that the same correction can be achieved with greater comfort for the user, for example.

Various methods have already been proposed for obtaining a refractive index gradient in a polymer material.

2. Description of the prior art

As disclosed in American patent US-A-3.718.383, for example, an additive composition, in practice a dilutant, can be absorbed into the polymer material, a hardened polymer material in this instance, in practise by diffusion.

Alternatively, as disclosed in the Japanese patent document No 60-175009 a gel can be treated with a monomer adapted to produce a polymer whose index of refraction is different than that of the base material, after which the combination is finally polymerized to set the geometry of the refractive index gradient which is then obtained.

However, this geometry depends directly on the concentration profile of the monomer within the polymer base material.

It therefore depends on the polymer/monomer interaction and can therefore be affected by changes of temperature that may occur during the diffusion process.

Under these conditions, it is difficult to control accurately the spatial distribution of the refractive index gradient obtained.

In either case, a refractive index gradient can be achieved only over a limited distance, this being the distance over which the monomer diffuses into the polymer base material.

To obtain accurate control of the spatial distribution of the refractive index gradient it has been proposed to diffuse a mixture of monomers into a gel, to vary the composition of the mixture during the diffusion process until a relative concentration profile is obtained which matches the required refractive index gradient profile and then to complete the polymerization of the whole to fix the resulting refractive index gradient geometry.

Although satisfactory in other respects, this method is unable to increase significantly the distance over which a refractive index gradient can be obtained, this distance being still limited by the diffusion process.

A general object of the present invention is a method enabling this difficulty to be overcome and the spatial distribution of the refractive index gradient obtained to be monitored and controlled.

SUMMARY OF THE INVENTION

The invention consists in a method of manufacturing a transparent polymer material article having a refractive index gradient in which the polymer base material is caused to absorb a swelling agent including at least a monomer adapted to yield a polymer having a refractive index different than that of the polymer base material wherein a first preform having a first geometry is formed from said polymer base material sufficiently polymerized for said first preform to be self-supporting, a confinement space is defined between said first preform and an abutment member having facing it a second geometry at least partly different than said first geometry and having a greater volume than said first geometry, said first preform is brought into contact in said confinement space with a sufficient quantity of swelling agent for the swelling to which it is then subject to cause it to be urged actively into contact with all points of said second geometry, the resulting polymer material is polymerized and the second preform thus obtained is machined, if necessary, to the required final geometry of the required article.

By confining the swelling of the treated polymer material there is produced in the relevant part thereof a swelling gradient responsible for most of the required refractive index gradient.

The swelling gradient itself depends only on the difference between the two geometries between which the swelling develops one preform from the other.

In this way the spatial distribution of the refractive index gradient obtained in the second preform depends only on the geometry differences.

It is therefore possible to obtain any refractive index gradient profile over all or part of the article concerned.

All that is required is to choose appropriately the two geometries to be used.

With the swelling gradient achieved in accordance with the invention, and unlike the prior art diffusion processes previously described, the refractive index gradient is advantageously developed in a transverse direction to that in which the swelling is obtained.

In practise this direction is a radial direction of the article concerned.

Be this as it may, there is therefore no longer any limit as to the distance over which the refractive index gradient obtained can effectively extend.

As previously, all that is required is to choose appropriately the two geometries employed.

It is theoretically possible, and tests have confirmed this, to obtain the refractive index gradient with a single swelling.

The refractive index is then advantageously constant along any straight line parallel to the direction in which the swelling gradient is developed.

In all cases the maximum difference in refractive index that can be achieved with the method in accordance with the invention depends firstly on the refractive indices of the polymer base material and the swelling agent and secondly on the maximum swelling of the polymer base material relative to the swelling agent.

All that is required is therefore to choose these materials appropriately.

The features and advantages of the invention will emerge from the following description given by way of example with reference to the appended diagrammatic drawings.

BRIEF DESCRIPTION OF THE DRAWINGS

FIGS. 9, 10, 11 and 12 are views in axial cross-section analogous to that of FIG. 5 and each relating to a respective preform having a different spatial distribution of the refractive index gradient than the preform shown in FIG. 5.

FIG. 13 is a diagram summarizing these spatial distributions of the refractive index gradient.

FIG. 14 is a view in cross-section analogous to that of FIG. 4 relating to an alternative embodiment.

DETAILED DESCRIPTION OF THE INVENTION

Figure 1:
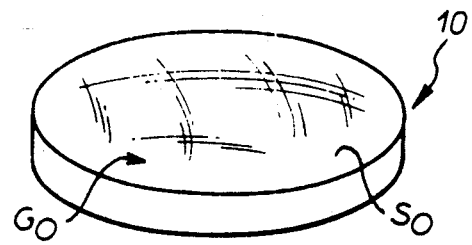
FIG. 1 is a perspective view of a transparent polymer material article having a refractive index gradient to the manufacture of which the invention may be applied.
Figure 2:
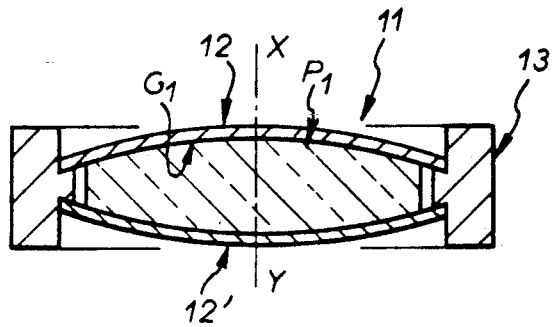
FIG. 2 is a view in cross-section relating to the prior manufacture of a first preform of this article.
Figure 3:
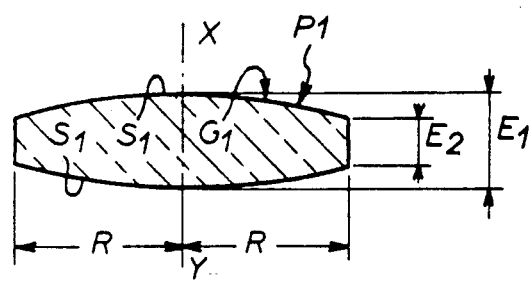
FIG. 3 is a view in cross-section of this preform.
Figure 5:
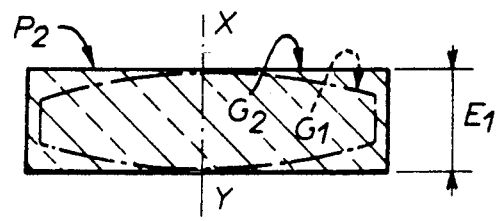
FIG. 5 is a view in cross-section of the second preform assumed to have been polymerized in situ before swelling is complete.
Figure 6:
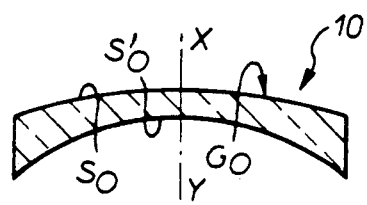
FIG. 6 is a view in cross-section of the required article as obtained after appropriate machining of the second preform.

FIGS. 1 through 14 show by way of example the application of the invention to the manufacture of an ophthalmic lens 10 shown separately in FIGS. 1 and 6.

A transparent polymer base material is caused to absorb, by methods to be described in more detail later, an additive composition comprising at least one monomer adapted to yield a polymer having a refractive index different than that of the polymer base material.

According to the invention, the additive composition is a swelling agent.

The combination of the polymer base material and the swelling agent including at least one monomer must in practice preferably meet the following requirements:

Firstly, and by definition, it must be possible for the polymer base material to swell due to the action of the swelling agent at least sufficiently to implement the method in accordance with the invention.

The polymer base material and the swelling agent are preferably, but not necessarily obligatorily, chosen so that the polymer base material swells by at least 100% in the presence of the swelling agent.

Also, the final polymer material must be transparent.

Finally, to obtain a meaningful refractive index gradient there must be at least a certain difference of refractive index between the polymer base material and the polymer produced by the swelling agent.

The polymer base material and the swelling agent are preferably selected so that this difference in refractive index is equal to 0.005 at least.

The polymer base material may comprise a polyolefin, for example.

It may be a polyolefin, for example.

It is then mostly styrene and the appropriate swelling agent essentially comprises methyl methacrylate.

The resulting swelling coefficient G is 100% and the maximal refractive index difference Dmax is in the order of 0.05.

A reticulating agent is preferably added to the polymer base material, for example divinylbenzene or triethylene glycol dimethacrylate (TEGDM), in this case in the proportion of 0.5%.

A reticulating agent such as TEGDM, for example, is likewise preferably added to the swelling agent.

The polymer base material preferably includes a product such as allylmethacrylate, for example, in the proportion of 10% in this case, adapted to have its matrix link up with that of the additive composition so that the final polymer material obtained has a semi-RPI type matrix, in other words a matrix which, whilst being similar to interpenetrated polymer matrices, contains chemical bonds between the constituent polymers.

Table I gives a specific example for a combination of polymer base material and swelling agent and the results obtained.

TABLE I

| Polymer base material | Swelling agent | Results Results |
|---|---|---|
| Styrene | Methyl methacrylate | G = 100% Dmax = 0.05 |
| Allylmethacrylate (10%) | | |
| Dinvinylbenzene or TEGDM (0.5%) | TEGDM | |

The percentages in brackets in table I are percentages by weight relative to 100% for the styrene.

Alternatively, the polymer base material may comprise a polyurethane.

It may be a polyurethane, for example.

For example, it then results for the most part from the reaction of a substance comprising at least one isocyanate and at least one polyol and the swelling agent then essentially comprises styrene.

Table II gives a specific example for a combination of polymer base material and swelling agent and the results obtained.

TABLE II

| Polymer base material | Swelling agent | Results |
|---|---|---|
| IPDI (1) U 1004 (0.6) [catalyst: DBLE] T 301 (0.3) HEMA (0.1) | Styrene + 1% TEGDM | G = 100% Dmax = 0.05 |
| HDT (1) CAPA 200 (0.9) HEMA (0.1) | Styrene + 1% TEGDM | G = 400% Dmax = 0.07 |
| DESMODUR N 100 (1) CAPA 200 (0.9) HEMA (0.1) | Styrene + 1% TEGDM | G = 250% Dmax = 0.06 |
| HDT (0.5) DESMODUR W (0.4) Isocyanatoethyl methacrylate (0.1) CAPA 200 (1) | Styrene + 1% TEGDM | G = 150% Dmax = 0.05 |

The abbreviations used in table II have the following meanings:

| | |
|---|---|
| IPDI | isophorone diisocyanate manufactured by AQLS. |
| U 1004* | polyetherdiol manufactured by UGINE-KUHLMANN, |
| T 301* | polyester triol manufactured by UNION CARBIDE. |
| HEMA | hydroxy ethyl methacrylate, |
| HDT* | triisocyanathohexyl isocyanurate manufactured by RHONE-POULENC, |
| DBLE | dibutyldilaurate of tin, |
| CAP 200* | polyesterdiol manufactured by SOLVAY, |

| | |
|---|---|
| DESMODUR W* | diisocyanate of dicyclohexylmethane manufactured by BASF. |
| DESMODUR N 100* | triisocyanatohexyl biuret manufactured by BASF. |

*Registered trademark.

The figures in brackets in table II are the proportions of the isocyanate and alcohol reactive functions.

Finally, in table II and as with the previously referred to allylmethacrylate, the hydroxy ethyl methacrylate (HEMA) or the isocyanatoethyl methacrylate are products adapted to link the matrix of the polymer base material to that of the swelling agent [V. NEVISSAS, J. M. WIDMAYER and G. C. MEYER (STRASBOURG CRM), Journal of Applied Polymer Science, vol. 36, 1467-1473 (1988)].

In another embodiment the polymer base material may comprise both a polyurethane and an allyl type monomer which is unpolymerized at this stage.

The swelling agent then essentially comprises styrene.

Table III gives a specific example of such materials and the result obtained in the same conditions as previously.

TABLE III

| Polymer base material | Swelling agent | Results |
|---|---|---|
| HDT (1) CAPA 200 (0.9) [catalyst: DBLE] 99% to 70% HEMA (0.1) | Styrene + 1% TEGDM XR80 + TBPIN: 1% to 30% | G = 150% Dmax = 0.05 |

The abbreviations used in table III have the following meanings:

| | |
|---|---|
| TBPIN | terbutylperoxy trimethylhexanoate manufactured by SCPO. |
| XR80* | diethylene glycol diallycarbonate manufactured by RHONE-POULENC. |

*Registered trademark.

It should be emphasized that because the polymer base material comprises an allyl monomer in addition to a polyurethane the polyurethane matrix is formed in a first stage, the allyl monomer present being intended to react during final polymerization after swelling.

In this case the first preform is therefore a polyurethane matrix impregnated with allyl monomer.

After it is polymerized the allyl monomer improves the mechanical properties of the second preform and therefore of the final article obtained It should also be emphasized that the refractive indices mentioned in this application are those of the polymers in their final state, that is to say after the final polymerization producing the required article, and that the expression "polymer base material" as used in the present application must be interpreted in a broad sense.

In another embodiment the polymer base material comprises a polyurethane and an acrylic or methacrylic monomer with the same function as the allyl monomer of the previous embodiment.

Table IV shows this possibility subject to the same conditions as above.

TABLE IV

| Polymer base material | Swelling agent | Results |
|---|---|---|
| HDT (1) CAPA 200 (0.9) [catalyst: DBLE] 99% to 70% HEMA (0.11) Methyl methacrylate TEGDM 1% to 30% | Styrene + 1% TEGDM | G = 150% Dmax = 0.05 |

Practical methods of executing the invention will now be described with reference to FIGS. 1 through 6.

The first stage (FIGS. 2 and 3) is to produce a first preform P1 of the polymer base material which is sufficiently polymerized to be self-supporting.

The following composition from table II:
HDT (1),
CAPA 200 (0.9),
HEMA (0.1), is reacted in a mold 11 comprising two molding shells 12, 12' and an O-ring seal 13 holding them apart.

There is no a priori connection between the geometry G1 required for the first preform P1 and the geometry G0 required for the final ophthalmic lens 10 except that it must be possible to obtain the latter from the former, of course.

In the application shown the ophthalmic lens 10 is a concave-convex lens with an optical axis XY and a geometry G0 formed essentially by a convex surface S0 and a concave surface S'0.

As shown (Example 1), the first preform P1 then required is biconvex with a geometry G1 formed by two convex surfaces S1, S'1.

For example, the thickness E1 at the centre of the preform P1 is 10 mm, its thickness E2 at the edge is 5 mm, its diameter 2R is 80 mm and the radius of the convex surfaces S1, S'1 is 254 mm.

The mold 11 is constructed accordingly.

Its interior geometry is therefore the geometry G1.

0.1% DBLE is preferably added to the mixture placed in the mold 11 to act as a catalyst and the whole is heated from 42° C. to 80° C. in ten hours after which it is maintained at 80° C. for four hours.

In the polymer base material then constituting the first preform P1 obtained in this way the degree of polymerization is in the order of 100%.

Alternatively, it could be between at least the degree of polymerization for the gel form and 100%.

Generally speaking, it is sufficient that it should render the first preform P1 obtained self-supporting.

Be this as it may, the refractive index of the transparent polymer material is 1.5.

According to the invention, a confinement space 14 is then defined between the first preform P1 and at least one abutment member 16, 16' having a second geometry G2 which differs at least in part from the first geometry G1 and has a greater volume than the latter.

Figure 4:
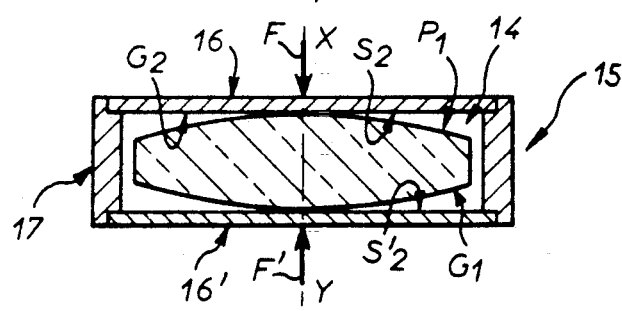
FIG. 4 is a view in cross-section relating to the manufacture of a second preform of the required article.

As in the embodiment specifically shown in FIG. 4, for example, the first preform P1 is placed in a confinement enclosure 15.

Like the mold 11, the confinement enclosure 15 comprises two walls 16, 16' each of which constitutes one abutment member 16, 16' and an 0-ring seal 17 holding the walls 16, 16' apart.

In this specific embodiment both the walls 16, 16' are flat plates whose inside surfaces S2. S'2 are perpendicular to the optical axis XY and separated by a distance equal to the thickness E1 at the center of the first preform P1, which is 10 mm.

As symbolically shown by arrows F, F', the walls 16, 16' are appropriately braced, for example by means of a clamp (not shown).

The first preform P1 is brought into contact with the selected swelling agent in the confinement space 14 delimited in the confinement enclosure 15 by a method that will not be described here as it will be obvious to the man skilled in the art.

This substance is styrene to which 1% TEGDM and 0.5% azobisisobutyronitrile catalyst have been added.

The refractive index of the polymer produced by this swelling agent is 1.59.

The swelling of the first preform P1 at ambient temperature in contact with this swelling agent takes four days in practise.

The quantity of swelling agent used is in practice sufficient for this swelling to cause the first preform P1 to be urged actively into contact with all points of the second geometry G2 defined by the abutment members 16, 16' formed by the walls 16, 16' of the confinement enclosure 15. The result is as if its convex surfaces S1, S'1 were brought into contact at all points with the plane surfaces S2, S'2.

The resulting polymer material is then polymerized by carrying out a heating cycle during which the temperature is raised to 100° C.

This polymerization is carried out in situ and must of course take place before swelling is complete, so that a swelling gradient is obtained within the treated material.

It is in this sense that the required second preform P2 is said to be urged actively into contact with all points of the abutment members 16, 16'.

Because of this, the second preform P2 obtained (see FIG. 5) has a second geometry G2 which is a mirror image of that defined by the abutment members 16, 16'.

In this embodiment it is therefore a disk-shape blank with plane surfaces and a circular contour, the O-ring seal 17 also acting as an abutment member.

To explain the invention more clearly, FIG. 5 shows the geometry G1 of the original preform P1 in chain-dotted outline inside this blank.

Figure 7:
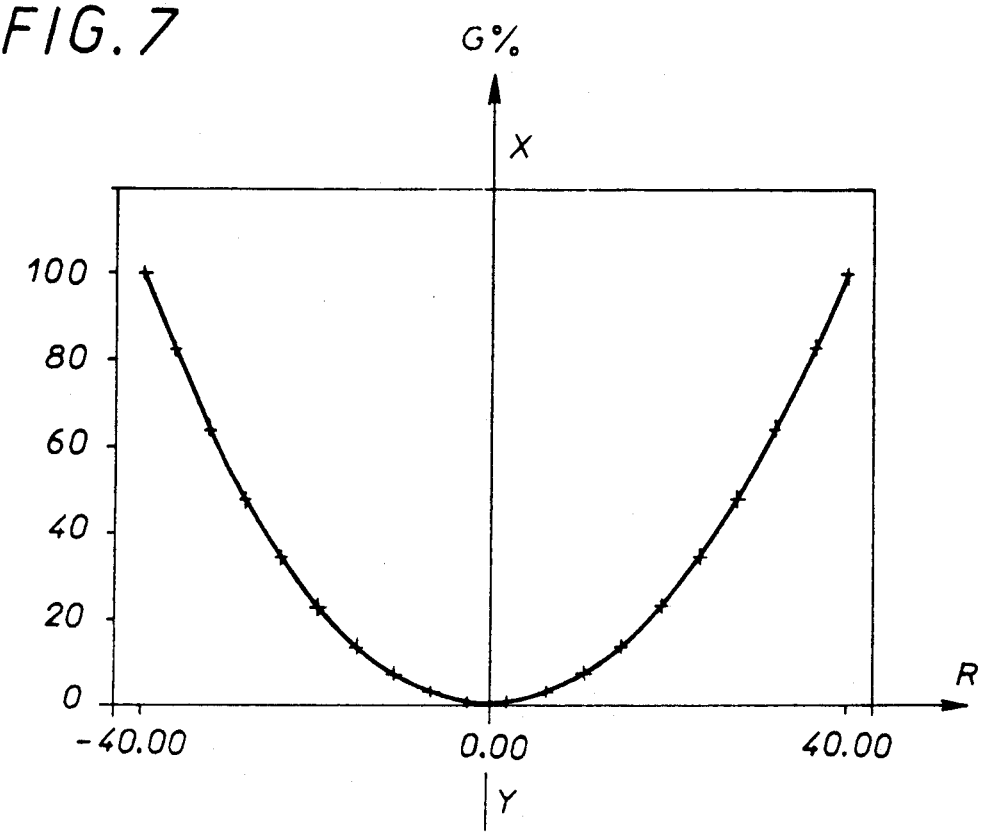
FIGS. 7 and 8 are diagrams relating to this article.

FIG. 7 is a graph showing the swelling G between the first preform P1 and the second preform P2 as a function of the radius R.

Because of the methodology employed, there is no swelling on the optical axis XY and the swelling then increases in the radial direction away from this axis to a maximum at the edge.

Given the original thickness E1 of the first preform P1 at its edge, this maximum swelling is 100%.

Figure 8:
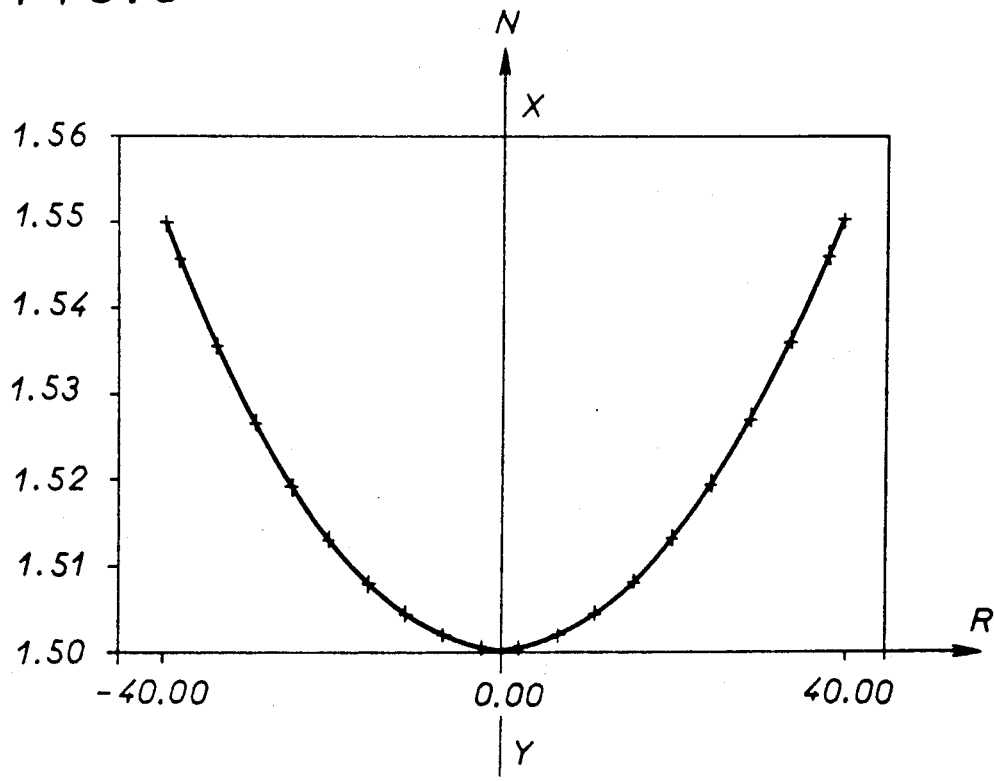

FIG. 8 is a graph showing the refractive index N profile obtained after swelling and polymerization as a function of the radius R.

The refractive index is in the order of 1.5 on the optical axis XY.

At the edge it is in the order of 1.55.

If required, as is the case in this embodiment, the second preform P2 obtained is machined to yield the final geometry G0 required for the ophthalmic lens 10.

FIGS. 9 through 12 relate to examples of preforms P2 which all have the same geometry G2 as the previous preform P2 but different spatial distributions of the refractive index. The preforms P1 from which they are obtained, shown in chain-dotted outline, have different geometries G1 but the same diameter 2R equal to 80 mm.

In FIG. 9 (Example 2) the preform P1 is biconvex but its convex surfaces S1, S'1 have a different radius than the previous convex surfaces S1, S'1.

This radius is 321.25 mm, the thickness at the center is 10 mm and the thickness at the edge is 5 mm, for example.

In FIG. 10 (Example 3) the preform P1 is biconcave.

The concave surfaces have the same radius 321.25 mm, the thickness at the center is 5 mm and the thickness at the edge is 10 mm, for example.

In FIG. 11 (Example 4) the preform P1 is plano-convex.

The radius of the convex surface is 110.41 mm and the thickness at the edge is 2.5 mm, for example.

Finally, in FIG. 12 (Example 5) the profile of the surfaces S1, S'1 of the preform P1 features a point of inflexion.

The surfaces S1, S'1 have the same profile, for example. They are convex at the center and their radius in this central area is 134.08 mm while the radius in the concave area of their profile is 81.25 mm, the thickness at the center is 10 mm and the thickness at the edge is 2 mm, for example.

FIG. 13 is a graph showing the profile of the refractive indices N obtained after swelling and polymerization.

In this diagram the curve N2 relates to Example 2, the curve N3 to Example 3, the curve N4 to Example 4 and the curve N5 to Example 5.

In the embodiment shown in FIG. 14 the confinement space 14 is operative in a localized area because of a localized depression provided to this end in the surface S1 of the preform P1.

The confinement volume 14 is in practise defined between the preform P1 and a molding shell 16 constituting the abutment member 16 and espousing the shape of the surface S1 outside the confinement space 14.

The molding shell 16 must of course be braced as previously or, more generally, fixed relative to the part of the surface S1 of the preform P1 that is not part of the surface of the confinement space 14.

The present invention is obviously not limited to the examples described and shown, either with regard to the geometries employed or with regard to the materials used.

Nor is the invention limited to the specific methodologies described, but encompasses any variant thereof.

Specifically, to homogenize the mechanical properties of the final polymer some swelling may also be developed along the optical axis.

All that is required to achieve this is to space away from the first preform P1 the abutment members 16, 16 constituting the walls 16, 16' of the confinement enclosure 15 by providing spacer means for the first preform P1 adapted to hold it between the walls 16, 16'.

The swelling along the optical axis XY may then be 100% and that along the edge in the border of 200%, for example.

What is more, the swelling could be applied to only one surface of the first preform rather than both surfaces.

This might apply in particular to the manufacture of a semi-finished ophthalmic lens already having the required geometry on one surface.

Similarly, although in the foregoing description swelling occurs in all of the polymer base material, swelling may equally well occur in only part of this material.

Finally, the first and/or the second preform need not necessarily be symmetrical about an axis of revolution.

There is claimed:

1. Method of manufacturing a transparent polymer material optical element having a refractive index gradient, comprising the steps of providing a polymer base material and a swelling agent for the polymer base material, the swelling agent containing a monomer adapted to yield a polymer having a refractive index different from that of the polymer base material, providing a first preform from the polymer base material having a first geometry and sufficiently polymerized to be self-supporting, providing an abutment member having a second geometry at least partly different from the first geometry of the preform, placing the preform in a containment space having a volume greater than that of the first preform and defined in part by the abutment member such that the first geometry of the first preform faces the second geometry of the abutment, bringing the first preform into contact with a sufficient quantity of the swelling agent to cause the preform to swell so that it comes into active bearing engagement along the entire first geometry, and polymerizing the swelled preform so as to obtain a second preform having a refractive index gradient.

2. Method according to claim 1, further comprising machining the second preform to the desired final geometry of the optical element.

3. Method according to claim 1, wherein the first geometry and the second geometry are geometries of rotation having an axis, the resulting refractive index gradient of the second preform being in a direction perpendicular to the axis.

4. Method according to claim 1, wherein the first geometry is convex and the second geometry is planar.

5. Method according to claim 1, wherein the first geometry is concave and the second geometry is planar.

6. Method according to claim 1, wherein the first preform has opposed convex surface and the confinement space is substantially right cylindrical with a circular cross section.

7. Method according to claim 6, further comprising machining the second preform to a desired concavo-convex geometry.

8. Method according to claim 1, wherein the first preform has opposed convex and planar faces and the confinement space is right cylindrical with a circular cross section.

9. Method according to claim 1, wherein the first preform is concavo-concave and the confinement space is right cylindrical with a circular cross section.

10. Method according to claim 1, wherein the first preform is placed in a confinement enclosure, the abutment member comprising at least one wall portion of the enclosure.

11. Method according to claim 1, wherein the difference between the refractive index of the polymer base material and the polymer yield by the monomer of the swelling agent is at least 0.005.

12. Method according to claim 1, wherein the polymer base material comprises a polyolefin.

13. Method according to claim 12, wherein the polymer base material is mainly styrene and the swelling agent essentially comprises of methyl methacrylate.

14. Method according to claim 1, wherein the polymer base material comprises a polyurethane.

15. Method according to claim 14, wherein the step of providing the polymer base material includes reacting a composition comprising at least an isocyanate and at least a polyol, the swelling agent comprising styrene.

16. Method according to claim 14, wherein the polymer base material further comprises a monomer selected from the group consisting of allyl, acrylic and methacrylic monomers.

17. Method according to claim 1, wherein the polymer base material comprises a matrix and further contains a product for linking the matrix to the swelling agent.

18. Method according to claim 1, wherein the refractive index gradient of the second preform has a direction of orientation which is transverse to a primary direction of swelling of the first preform.

19. Method according to claim 1, wherein said polymerizing of the swelled preform is performed before swelling of the preform is complete, thereby to obtain said refractive index gradient.

20. Method of manufacturing a transparent polymer material optical element having a refractive index gradient, comprising the steps of providing a polymer base material and a swelling agent for the polymer base material, the swelling agent containing a monomer adapted to yield a polymer having a refractive index different from that of the polymer base material, providing a first preform from the polymer base material having a first geometry and sufficiently polymerized to be self-supporting, providing an abutment member having a second geometry at least partly different from the first geometry of the preform, providing a containment space between the first preform and the abutment member such that the first geometry of the first preform faces the second geometry of the abutment, bringing the first preform into contact with a sufficient quantity of the swelling agent to cause the preform to swell so that it comes into active bearing engagement along the entire first geometry, and polymerizing the swelled preform so as to obtain a second preform.

21. Method according to claim 20, wherein the abutment member is defined by a shell member and the confinement space is formed between a depression in the first preform and a facing portion of the shell member.

22. Method according to claim 20, wherein the refractive index gradient of the second preform has a direction of orientation which is transverse to a primary direction of swelling of the first preform.

23. Method according to claim 20, wherein said polymerizing of the swelled preform is performed before swelling of the preform is complete, thereby to obtain said refractive index gradient.

24. Method according to claim 1, wherein the refractive index gradient lies in a direction which extends transversely to that of the swelling of the first preform from the first geometry to the second geometry.

25. Method according to claim 24, wherein the optical element has an axis, the direction of the refractive index gradient extending radially in relation to said axis.

26. Method according to claim 1, wherein said first and second geometries are geometrically non-similar.

27. Method according to claim 20, wherein the refractive index gradient lies in a direction which extends transversely to that of the swelling of the first preform from the first geometry to the second geometry.

28. Method according to claim 27, wherein the optical element has an axis, the direction of the refractive index gradient extending radially in relation to said axis.

29. Method according to claim 20, wherein said first and second geometries are geometrically non-similar.

* * * * *